(Model.)
E. YEISER.
DOOR LOCK.
No. 373,214.
5 Sheets—Sheet 1.
Patented Nov. 15, 1887.
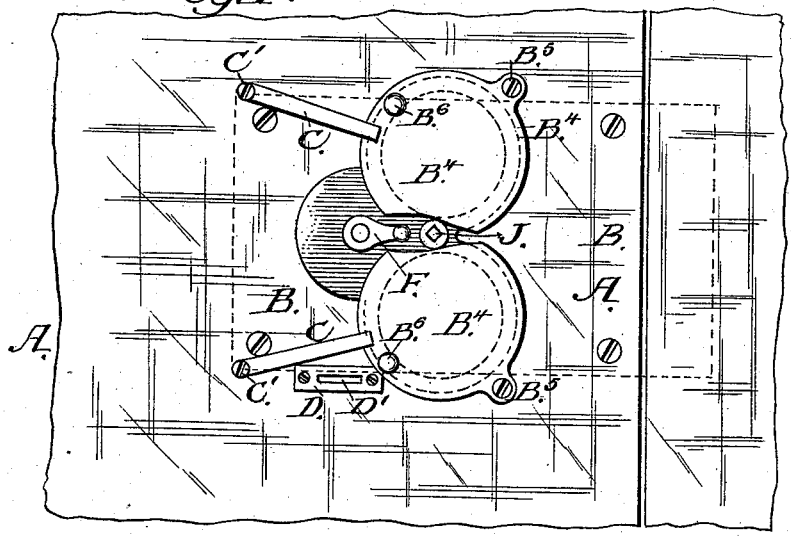
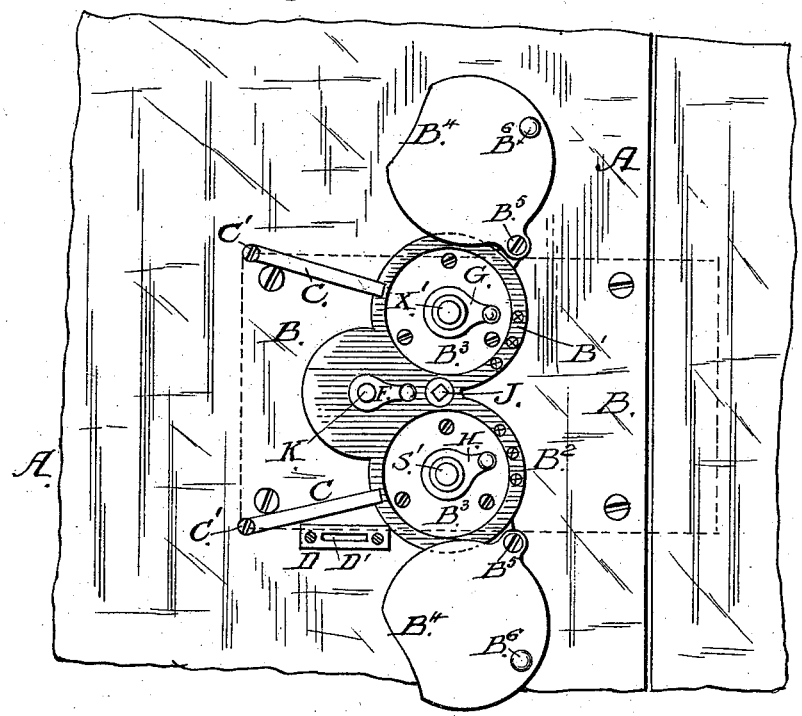
WITNESSES
T. W. Fowler
H. B. Applewhite
INVENTOR
Edmund Yeiser,
Thomas P. Hinsey
Attorney (Model.)
5 Sheets—Sheet 2.
E. YEISER.
DOOR LOCK.
No. 373,214. Patented Nov. 15, 1887.
Fig. 3.
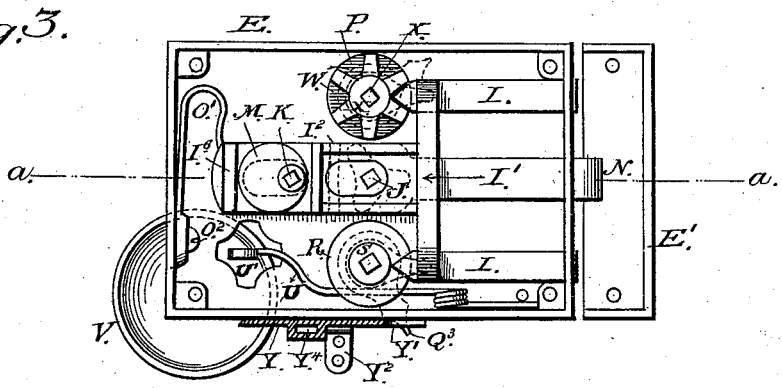
Fig. 4.
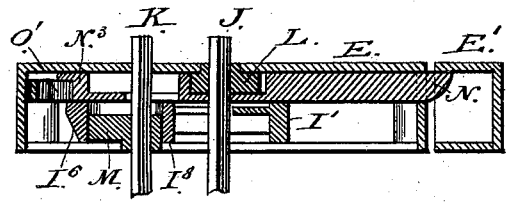
Fig. 5.   Fig. 6.
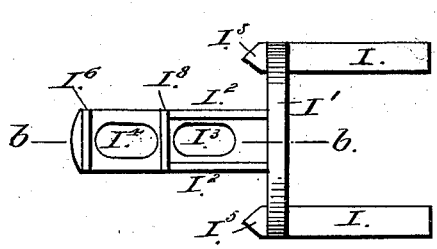   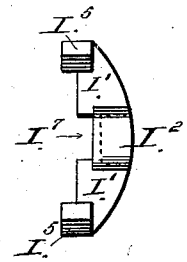
Fig. 7.
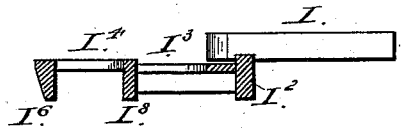
WITNESSES
T. W. Fowler,
H. B. Applewhait
INVENTOR
Edmund Yeiser,
Thomas P. Kinsey
Attorney
N. PETERS, Photo-Lithographer, Washington, D. C.

(Model.) 5 Sheets—Sheet 3.
E. YEISER.
DOOR LOCK.

No. 373,214. Patented Nov. 15, 1887.

WITNESSES
T. W. Fowler
H. B. Applewhite

INVENTOR
Edmund Yeiser
Thomas P. Irwin
Attorney (Model.)
5 Sheets—Sheet 4.
E. YEISER.
DOOR LOCK.
No. 373,214.     Patented Nov. 15, 1887.
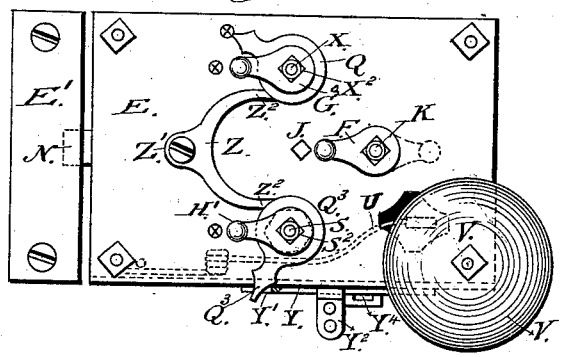
Fig. 14.
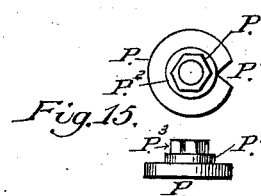
Fig. 15.
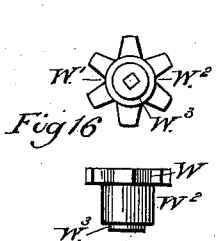
Fig. 16.
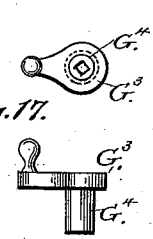
Fig. 17.
Fig. 18.
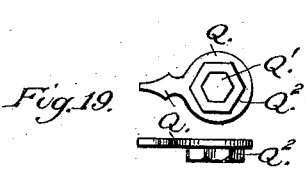
Fig. 19.   Fig. 20.
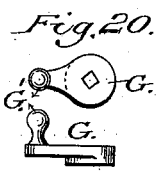
Fig. 21.
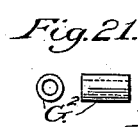
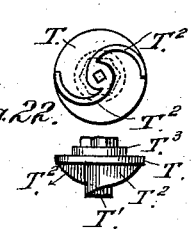
Fig. 22.
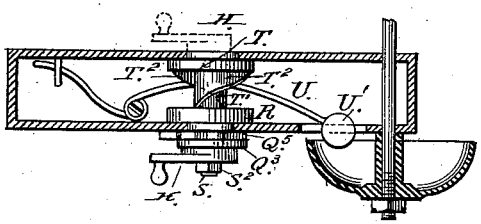
Fig. 23.
WITNESSES
T. W. Fowler
H. B. Applewhaite
INVENTOR
Edmund Yeiser,
Thomas P. Hussey
Attorney
N. PETERS, Photo-Lithographer, Washington, D. C.

(Model.)

E. YEISER.
DOOR LOCK.

No. 373,214.  Patented Nov. 15, 1887.

5 Sheets—Sheet 5.

WITNESSES
T. N. Fowler
H. B. Applewhaite

INVENTOR
Edmund Yeiser,
Thomas P. Kinsey
Attorney

N. PETERS, Photo-Lithographer, Washington, D. C.

UNITED STATES PATENT OFFICE.

EDMUND YEISER, OF NEWMANSTOWN, ASSIGNOR OF PART INTEREST TO JOHN S. GARRETT, OF PHILADELPHIA, EDWIN S. GARRETT, OF SHERIDAN, AND MILTON C. ZIMMERMAN, OF NEWMANSTOWN, PENNSYLVANIA.

DOOR-LOCK.

SPECIFICATION forming part of Letters Patent No. 373,214, dated November 15, 1887.

Application filed May 3, 1886. Serial No. 200,965. (Model.)

*To all whom it may concern:*

Be it known that I, EDMUND YEISER, a citizen of the United States, residing at Newmanstown, county of Lebanon, State of Pennsylvania, have invented a new and useful Improvement in Door-Locks, of which the following is a specification.

This invention pertains more particularly to the class of locks operated without a key. The object of the invention is to construct a door-lock that will give positive security against burglars, and at the same time, for ordinary day use, will serve as a simple lock. The majority of combination-locks that depend upon memorizing for their successful operation consume too much time to be readily used as a front-door lock; but my improvement gives all the security of the combination without its complexity.

The drawings herewith will give an expert a full knowledge of the constructive details, and with the subsequent descriptive matter of the specification an understanding of the mode of operating the lock, similar letters of reference indicating similar parts throughout.

Figure 8:
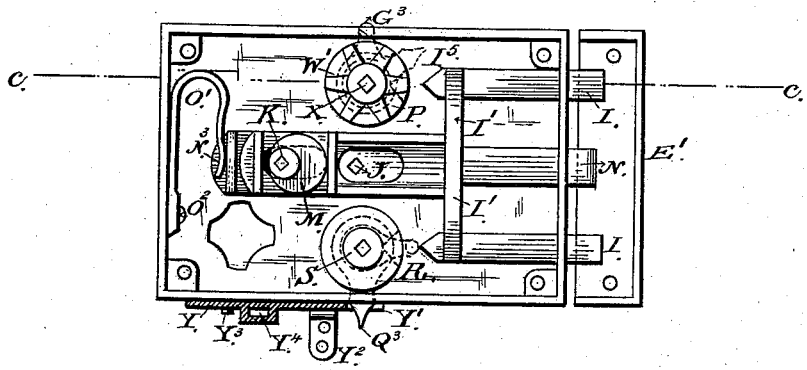
Figure 9:
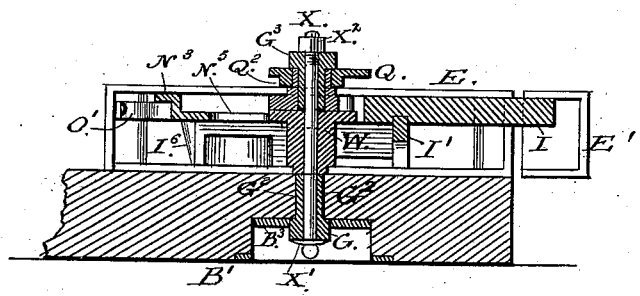
Figure 10:
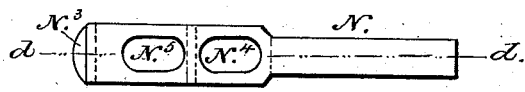
Figure 11:
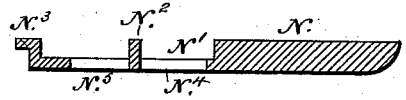
Figure 12:
Figure 13:
Figure 24:
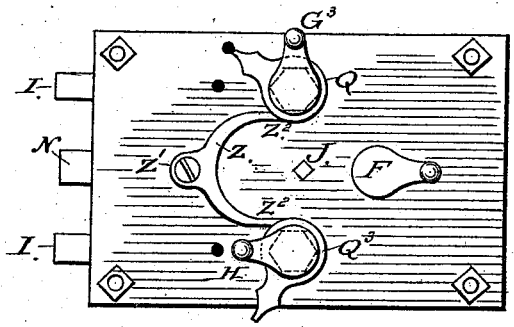
Figure 25:
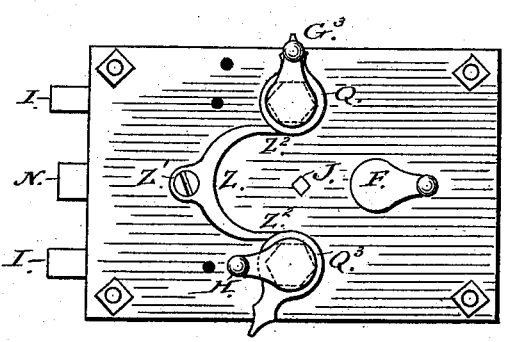
Figure 26:
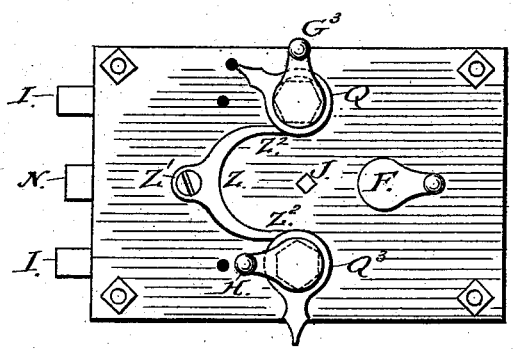

Figure 1 represents the appearance of the front door having a lock of my construction attached to the same, the knob being removed in this and all the subsequent figures to show more clearly the constructive details. In this figure the operative parts are concealed by the closed weather-guards. Fig. 2 represents the same door with the weather-guards thrown back, disclosing the operative parts in their normal position, the door-lock used as a simple spring-latch. Fig. 3 represents the case removed from the door with the closing-plate removed and the lock as a simple spring-latch, with the double bolt in the tumbler-pocket; Fig. 4, a longitudinal section upon the line *a a* of Fig. 3, showing the latch and bolt-dogs in place; Fig. 5, a plan of the double locking-bolt; Fig. 6, an end view of the same, and Fig. 7 a longitudinal section on the line *b b* of Fig. 5; Fig. 8, a view of the interior of the lock, showing the double locking-bolt shot forward into the keeper and the tumblers turned to prevent the retraction of the bolt; Fig. 9, a longitudinal section on the line *c c* of Fig. 8, showing the tumbler, index-pointer, and finger-piece connection therewith; Fig. 10, a plan of the spring-latch; Fig. 11, a longitudinal section of the same on the line *d d* of Fig. 10; Fig. 12, a front elevation and top plan of the spindle-dog for the spring-latch; Fig. 13, a side elevation and top plan of the double locking-bolt dog or cam; Fig. 14, a view of the face of the lock-case upon the inside of the door, showing the index-pointers and finger-pieces in their normal positions, corresponding with the same in Fig. 2. Fig. 15 represents in plan and side elevation the form of tumbler controlled by the index-pointer, Fig. 16 representing the form of tumbler controlled by the upper finger-piece from either the front or rear of the lock; Fig. 17, a reversed plan and side elevation of the upper inner finger-piece; Fig. 18, a reverse plan and side elevation of the upper index-pointer; Fig. 19, a reverse plan and side elevation of the lower index-pointer; Fig. 20, a plan and side elevation of finger-piece for the locking tumbler; Fig. 21, an end elevation and side elevation of sleeve for spring-latch connection of tumbler or dog. Fig. 22 represents in plan and elevation the alarm-bell-hammer-actuating device; Fig. 23, a cross-section on the line of the alarm-bell device. Fig. 24 shows the disposition of the index-pointers and finger-pieces when the door is locked, so that it may be unlocked from either the street or the inside of the house. Fig. 25 shows the disposition of the index-pointers and finger-pieces when the door is locked and can only be opened by a person inside of the house. Fig. 26 shows the disposition of the index-pointers and finger-pieces when the door is locked from either the outside or inside of the door and the dead-latch is thrown into action. In this case the door cannot be unlocked until the dead-latch key has been used to remove the obstruction.

The lock is reversible, and may therefore be used for a right or left hand door lock, the only apparent difference being that in one instance the alarm-bell will be at the lower corner, as shown. In the other instance it will be at the upper corner, as the operation of the same is not affected by a reversal of its position. It therefore makes a very convenient lock to apply.

In the drawings, A represents a portion of a front door provided with one of my improved locks and having upon the outer face thereof a metallic plate, B, with two semi-annular portions, B' B², integral therewith, the door being recessed at B' B² to correspond with the inner diameter of the semi-rings. The recesses, which are sunk deep enough to bring the finger-pieces below the face of the door, are covered by metallic disks or escutcheon-plates B³, which are perforated for the spindles of the finger-pieces.

As a protection against the weather and to prevent the exposure of the operative parts of the lock, guard-plates B⁴ are pivoted at B⁵ to ears upon the semi-rings B' B², and have handles B⁶ for facility in operating the same. Springs C, secured at C', serve to hold the guards in place when closed, as shown in Fig. 1. A dead-latch escutcheon, D, with opening D', completes the trimming of the door. The knob-spindle J is shown central to the trimmings, with the double locking-bolt operative finger-piece F, fixed on shaft K, on the left of the same. The upper finger-piece, G, operates a locking tumbler, while the lower finger-piece, H, operates the alarm-bell.

In Fig. 3 I show within the lock-case E the double locking-bolt composed of the two bolts I, connected by a cross-bar, I', with a central operating-bar, I², the latter perforated at I³ and I⁴ to permit reciprocation of the bar I² over the spindles J and K, respectively, operating the dogs L M. The bolts I have their rear ends projected to the rear of the cross-bar I' and given a pointed form, I⁵, corresponding with the notch of the locking-tumblers. A notch, I⁷, in the cross-bar I' permits the spring latch N to operate freely beneath the cross-bar. I⁶ is an abutment located at the end of the slot I⁴ for the dog M to operate upon in retracting the double bolt, and I⁸, located at the other end of slot I⁴, is the abutment for said dog to operate upon to shoot the double bolt forward and lock the same within the keeper E'.

The spring-latch N is operated by the three-armed dog L, having projections L', which dog is secured upon the spindle J, the latter being connected with the door-knobs in any suitable manner. Said latch is provided with a recess, N', for the dog L, and an abutment, N², by which the latch is retracted. A projected rear portion, N³, serves as a seat for the spring O', secured to the case at O², which spring keeps the latch in its normal state within the keeper E'. Perforations N⁴ and N⁵ permit the latch to slide clear of the spindles J and K.

A tumbler-disk, P, having a single notch, P', corresponding with the end I⁵ of the double locking-bolt, is held in suitable bearings in the upper portion of the case E by a projected portion, P², a hexagonal stem, P³, serving to connect the same with the index-pointer Q by its hexagonal aperture Q'. The stem is hollow to permit the tumbler-disk P and index-pointer Q to operate without any disturbance of the positions of the finger-pieces G and G³, the former located upon the outside of the door and the latter upon the inside, both being secured to the spindle X. Hexagonal seats Q², operated upon by the bifurcated spring Z, serve to retain the index-pointer Q in position.

A tumbler-disk, R, similar in every respect to tumbler-disk P, is supported in a similar manner in the lower portion of the case E and has upon its outer end an index-pointer, Q³, cored at Q⁴ to turn free upon the stem of the lower finger-piece, H, similar to that of the stem G⁴ of the upper finger-piece, and provided with hexagonal faces Q⁵, operated upon by the bifurcated spring Z. Superimposed upon the tumbler-disk R is a device for operating the alarm-bell V, consisting of a disk, T, and stem T', the stem cored to move upon the square spindle S and to be operated thereby. A projected portion, T³, serves to steady its movement by a bearing in the case E. Wings T², of a spiral form, serve to raise the arm U of the bell-strike U' and to release the same at the proper time to give an alarm upon the bell V. A sleeve similar to that shown in Fig. 21 may be interposed between the tumbler-disk R and finger-piece H, the length of the sleeve and of the spindle S being regulated by the thickness of the door to which the lock is applied. A head, S', upon the outside end of the spindle, and a nut, S², upon the inside end serve to bind all the parts in free working order together upon the spindle.

Superimposed upon the tumbler-disk P in the upper portion of the case E, as shown, is a tumbler-disk, W, provided with six notches, W', corresponding with notch P', a stem, W², and projected portion W³. The stem is cored to move freely over the spindle X, and to be operated thereby. A finger-piece, G³, having a cylindrical stem or sleeve, G⁴, similarly cored to adapt it to the spindle X, is passed through the eye of the index-pointer Q, while a sleeve, G², is interposed between the tumbler-disk W and finger-piece G, of a proper length adapted to the thickness of the door and the insertion of the spindle X, with its head X' and nut X², serves to bind the parts together, so that the operation of the finger-piece G or G³ will move the parts simultaneously.

The dead-latch is a sliding piece, Y, having an arm, Y', projected upward from the door, with its end bifurcated to adapt it to receive the index end of pointer Q³. It is held against the lock-case by a clamp, Y², and guided by a pin, Y³. A yoke, Y⁴, serves to receive the dead-latch key by which the same is slid backward and forward, as desired.

A bifurcated or compound spring, Z, is secured upon the back of the case E at Z', and has its ends Z² in contact with the hexagonal seats Q² Q⁵ of the index-pointers Q and Q³, which creates sufficient pressure upon the index-pointers to retain them in any set position, undisturbed by the operations of the several finger-pieces with which the same are connected.

The operation of the lock is as follows: When used as a simple spring-latch during the day, the index-pointers Q Q³ and finger pieces F, G, G³, and H are placed in their normal position, as shown in Figs. 2, 3, and 14. The door may then be opened from either side by manipulating the knob-spindle J and dog L. When it is desired to lock the door from either side of the same, the position of the finger-piece F is reversed, which, operating the dog M, throws the double bolt forward beneath the keeper E'. The finger-piece G or G³ is then carried around to a vertical position, as shown in Figs. 8 and 24. This causes the tumbler-disk W to bring its unnotched portion opposite the end I⁵ of the bolt, and as long as the position of the finger-piece G or G³ is maintained the double bolt cannot be operated by its finger-piece F and dog M. The finger-piece G or G³ must be returned to its normal position to allow the bolt to be retracted by the dog M. The door being locked from either the inside or the outside of the same and additional security being desired by the inmates, both the finger-piece G³ and index-pointer Q are placed in a vertical position, as shown in Fig. 25. Under this condition of things the door cannot be unlocked from the outside, as there is no mode of manipulating the index-pointer from the outside, and unless one of the inmates chooses to return the index-pointer Q to its normal position there can be no entrance gained. Should the party inside return both the index-pointer Q and finger-piece G³ to their normal positions the door would be unlocked, and a turn of the knob operating the spring-latch would open the door. When it is desired to give additional security to the door from the outside alone, the index-pointer Q³, after locking the door, is set, as shown in Fig. 26, in a vertical position by the use of the dead-latch key. This changes the position of the lower tumbler-disk, R, and prevents the retraction of the double locking-bolt from the outside of the door to any party unprovided with a proper key.

The alarm-bell is operated by any party attempting to actuate the finger-piece H, thinking it connected with the locking device, and it is inoperative unless the door is locked and the dead-latch in the position indicated by the index-pointer Q³ in Fig. 26.

As all the parts composing the lock are susceptible of being cast, the lock can be constructed at a cheap rate. At the same time the security obtained by its use will favorably compare with that obtainable from the most expensive and elaborately-constructed locks.

Having shown the construction, operation, and advantages of my keyless door-lock, I desire to claim as follows:

1. The combination, with an inclosing-case, of a spring-latch and suitable operative mechanism therefor, a double locking-bolt consisting of an upper and a lower bolt united by a cross-bar, the upper bolt having a projecting rear end, a tumbler-disk provided with a suitably-connected index-pointer to operate the same and having a notch forming a pocket to receive the rear end of the upper bolt when it is retracted, and suitable means, substantially as described, for operating the double locking-bolt, as set forth.

2. The combination, with an inclosing-case, of a spring-latch and a double locking-bolt, each provided with suitable operative mechanism, the upper locking-bolt being provided with a projecting rear end, a tumbler-disk provided with an index-pointer and having a single notch in its periphery, a superimposed tumbler-disk having three or more notches in its periphery similar in form and coincident with the notch in the other tumbler-disk, and a spindle for operating the superimposed tumbler-disk and having finger-pieces secured thereto, respectively, upon the outside and inside of the door, substantially as described.

3. The combination, with an inclosing-case, of a spring-latch and suitable operating mechanism therefor, a double locking-bolt, a spindle provided with a finger-piece at each end thereof and carrying a tumbler-disk having several notches, a single-notched tumbler-disk turning loosely on said spindle and provided with an index-pointer, said tumbler-disks arranged to co-operate with the upper locking-bolt, a single-notched tumbler-disk arranged to co-operate with the lower locking-bolt and provided with an index-pointer, and a sliding piece engaging said index-finger and arranged to be actuated by a safety-key, substantially as specified.

4. The combination, with a lock having a spring-latch, double locking-bolt, actuating finger-pieces, and notched tumbler-disks provided with index-pointers having hexagonal hubs, as shown and described, of a compound or bifurcated flat spring secured to the back of the inclosing-case, with its arms in contact with the hexagonal seats provided therefor upon the hubs of said index-pointers, substantially as and for the purpose specified.

5. The combination, in a lock, of a double locking-bolt, a spindle provided with a finger-piece and carrying a dog for operating the double bolt, a notched tumbler-disk for engaging with the double bolt, an index-pointer connected with said notched tumbler-disk, and a dead-latch device consisting of a horizontal bar suitably attached to the lock-case, having a yoke adapted to receive a dead-latch key, and a vertical arm provided with a horizontal slot receiving the end of the index-pointer, whereby the movement of the bar carries with it the index-pointer and the notched tumbler and controls the operation of the double locking-bolt, substantially as described.

6. In combination with a lock, as shown and described, a main escutcheon-plate perforated for the spring-latch and locking-spindles and having two semi-annular rings with ears integral therewith, said rings forming protective edges to recesses sunk within the door, said recesses faced with escutcheon-plates, perforated respectively for the operative spindles of the locking-tumblers and alarm-bell device, and forming pockets for the protection of the finger-pieces secured to the same, substantially as shown, described, and for the purpose set forth.

7. The combination, with a door, of the escutcheon-plate B, having the annular portions B' B², inclosing the sunken recessed escutcheon-plates B³, the guard-plates B⁴, pivoted to the portions B' B² and provided with handles B⁶, and the springs C' C', attached to the door and adapted to bear upon the guard-plates B⁴ when closed, substantially as described.

EDMUND YEISER.

Witnesses:
THOS. L. BECKER,
HARRY P. S. ZELLER.